UNITED STATES PATENT OFFICE.

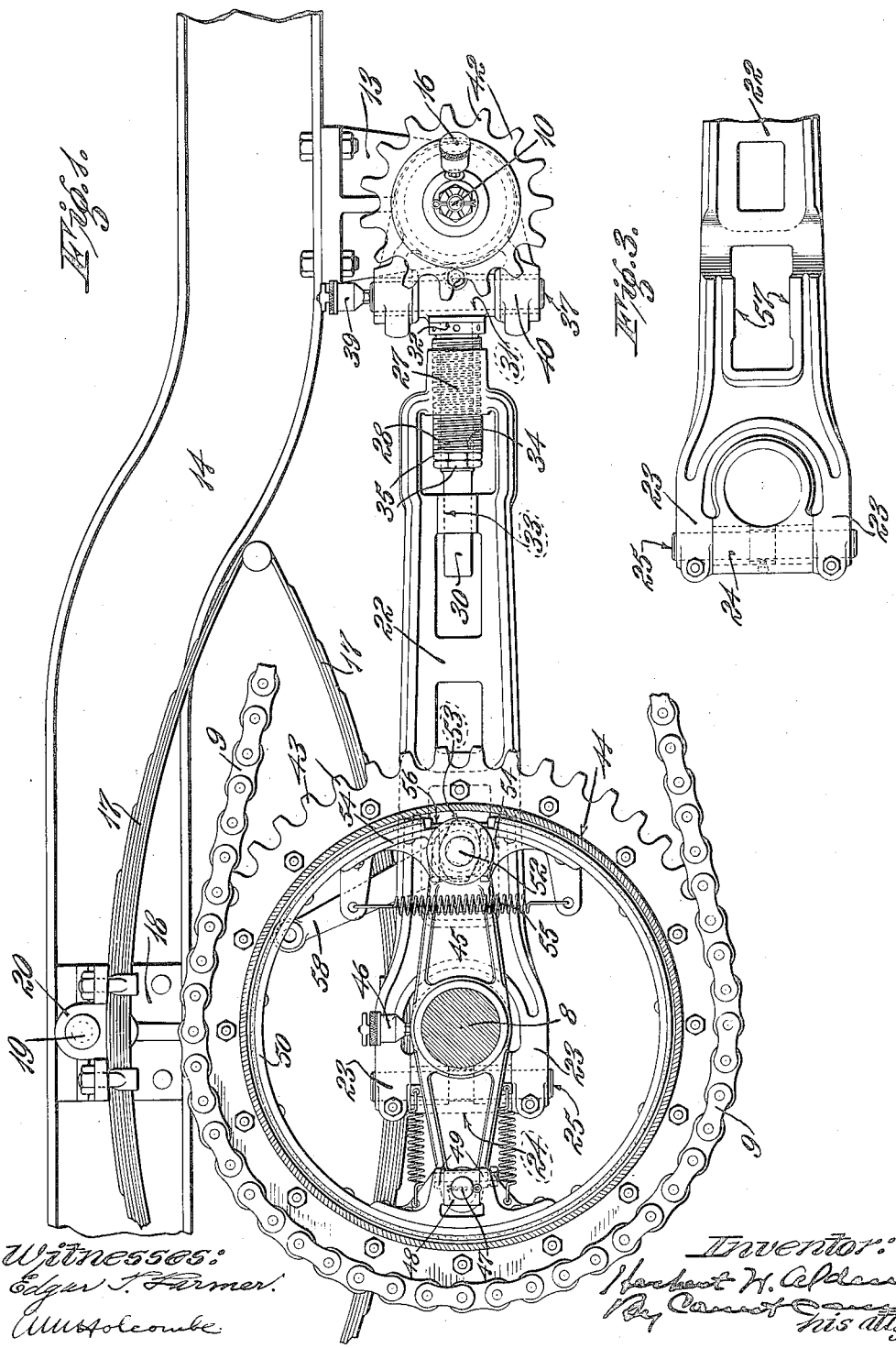

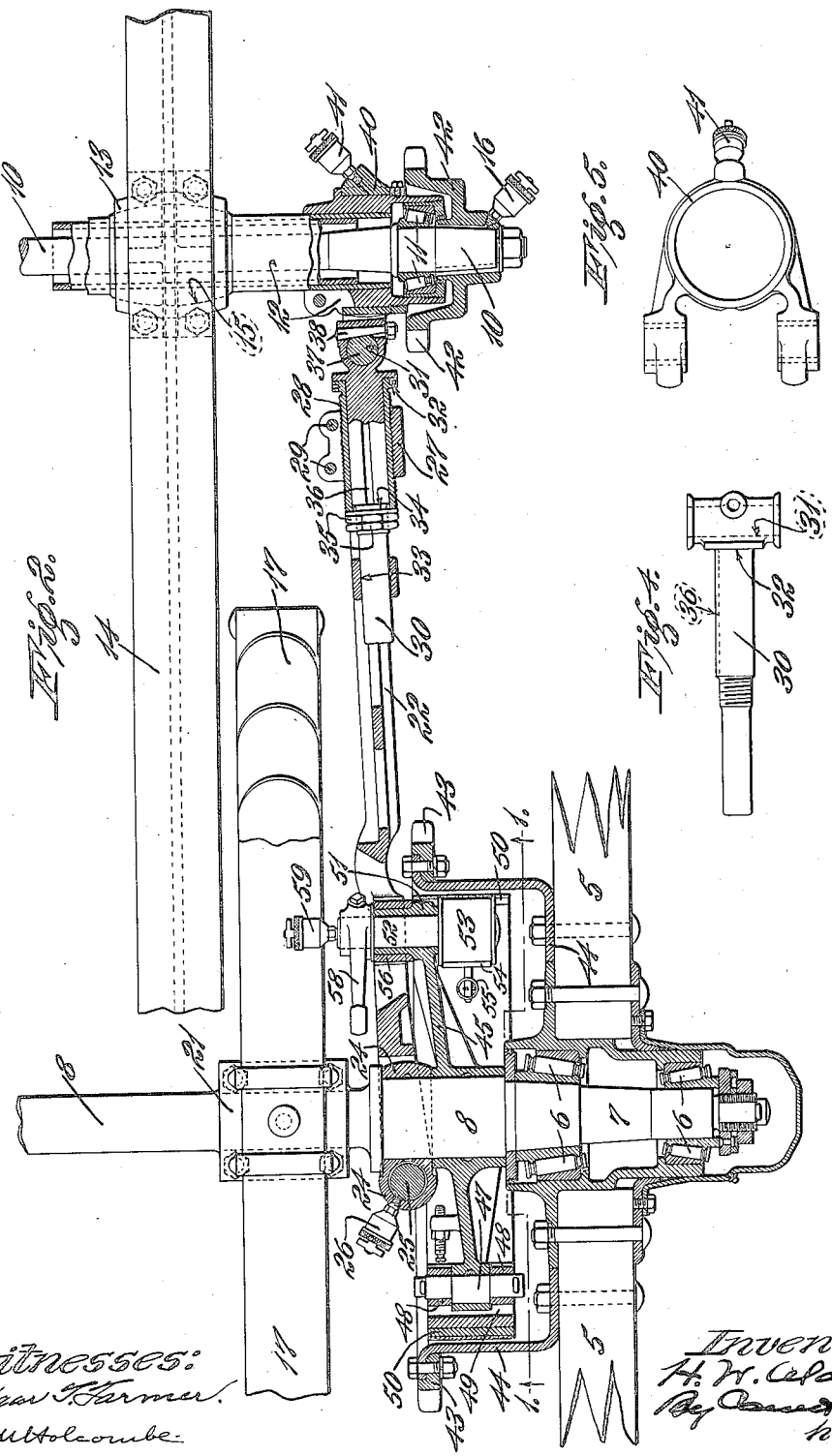

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

AUTOMOBILE RADIUS-ROD.

1,101,673.

Specification of Letters Patent.  Patented June 30, 1914.

Application filed May 21, 1913. Serial No. 768,968.

*To all whom it may concern:*

Be it known that I, HERBERT W. ALDEN, a citizen of the United States, and a resident of the city of Detroit, in the county of Wayne and State of Michigan, have invented a new and useful Improvement in Automobile Radius-Rods, of which the following is a specification.

This invention relates to the running gear of automobiles, particularly those in which the driving wheels are driven by means of sprocket chains from a jack shaft supported on the frame of the vehicle, but it is applicable to vehicles propelled by other means. In the usual construction of a vehicle to which this invention relates, the road wheels are mounted on anti-friction bearings on the ends of the axle, and the wheel hubs carry brake drums on their inner ends. If the vehicle is of the type in which the wheels are driven by sprocket chains, sprocket wheels, over which these driving chains pass, are bolted to flanges on the wheel hubs, or to the wheel spokes.

The object of this invention is to provide means for mounting the driving wheel brake parts in such a way that the action of the brake will not be affected by changes in the relative position of the axle with respect to the vehicle frame.

A further object of the invention is to provide means other than the vehicle springs to take the braking torque or tendency of the brake parts to rotate with the road wheel, upon applying the brakes when the vehicle is in motion.

A further object of the invention is to provide means for maintaining a fixed distance between the jack shaft which carries the driving sprockets for the driving chain and the ends of the axle upon which the driving wheels are mounted, irrespective of the vibration of the axle due to inequalities in the road, or of changes in its position with respect to the frame due to excessive or unequal flexure of the vehicle springs caused by improper loading or other causes.

A further object of the invention is to provide means for adjusting the tightness of the driving chain, and to maintain it at the proper tension while permitting limited sidewise movement and independent vertical movement of the ends of the axle with respect to the jack shaft.

With the above and other objects in view, as appears more fully hereinafter, this invention consists in providing a combined radius and torque rod having its ends pivoted to swivel couplings journaled one upon the jack shaft casing or other part fixed to the vehicle frame, and the other upon the axle.

The invention further consists in mounting the fixed braking parts for the driving wheel upon a brake spider journaled on the axle and having a sliding connection with the radius rod to resist the braking torque.

Further details of the invention appear in connection with the following description of a device made in accordance therewith, and which is illustrated in the accompanying drawings, and the novel and characteristic features of the invention are more fully pointed out in the appended claims.

Referring to the drawings, in which like characters designate the same parts in the several views,—Figure 1 is a side elevation of a portion of an automobile vehicle, showing the axle and spring mounting, and the driving means and brake parts for a vehicle wheel, the axle and vehicle wheel brake drum being shown in section on the line 1—1 in Fig. 2; Fig. 2 is a plan sectional view of the same, the vehicle frame and spring being partly broken away; Fig. 3 is a side elevation of the swivel connection and the rear portion of the radius rod; Fig. 4 is a side elevation of the adjustable front connecting rod portion of the radius rod; and Fig. 5 is a side elevation of the front swivel connection for the radius rod.

Only the parts on one side of the automobile immediately associated with a driving wheel and the portion of its axle adjacent thereto are shown in the drawings, it being understood that the other side of the automobile is similar in construction to that shown.

In the construction shown in the drawings, the road wheels 5 are mounted on antifriction bearings 6 on the spindle ends 7 of a solid axle 8. The road wheels are driven by side chains 9 from the ends of a jack shaft 10 provided with a differential gear or other device for equalizing the driving torque transmitted thereby from the motor to the road wheels. The jack shaft is rotatably mounted on antifriction bearings 11 in the ends of a tubular casing 12 seated in pedestals 13 supported from the side frame members 14 of the vehicle. The pedestals have spherical bearings 15 for the casing seats, which are also spherical where they engage the pedestals, whereby slight distortions of the frame will not bend or twist the casing and interfere with the alinement of the jack shaft. An oil cup 16 is provided for lubricating the jack shaft bearings.

As shown in Fig. 1, the frame 14 of the automobile is arranged above the road wheel axle 8, and is supported thereon by means of elliptic springs 17. The spring hangers 18 have pivotal connection with the springs by means of horizontal bolts 19 passing through lugs on the upper spring clip plates 20. The lower spring clips pass through seats 21 formed on the axle 8. The attachment between the springs and vehicle frame is such as to admit of pivotal movement of the springs with respect to the frame in their respective planes lengthwise of the vehicle.

A radius rod 22 is arranged at each end of the axle 8, connecting the ends of the axle with the ends of the jack shaft casing 12. The axle end of the radius rod is provided with forks 23 between which the axle 8 passes. A swivel connection 24 is pivoted between the forks 23 on a vertical pin 25. The swivel connection is journaled on the axle 8 between the spring seat 21 and driving wheel spindle end. An oil cup 26 is mounted on the swivel connection for lubricating it. The opposite end of the radius rod is formed with a longitudinal socket 27 which is split lengthwise and internally screw-threaded. Through this split socket is screwed the threaded shank of a tubular adjusting screw 28 which is clamped in adjusted position by means of the clamping bolts 29. Lengthwise arranged in the tubular bore of the adjusting screw is a rod 30 provided with a vertically arranged socket 31 and a shoulder 32 bearing against the adjusting screw at its outer end. This rod is rotatable in the adjusting screw. The inner end of the rod projects through the adjusting screw and is rotatably and slidably arranged in the longitudinally extending bore 33 of the radius rod 22 adjacent to the split socket 27 and in line therewith. A washer 34 held by lock nuts 35 on the inner end of the rod 30 adjacent to the adjusting screw prevents longitudinal movement of the rod in the bore of the screw. An oil groove 36 along the portion of the rod within the adjusting screw provides means for lubricating the parts. A trunnion pin 37 is arranged in the vertical socket 31 with its ends projecting above and below the socket. This trunnion is secured in place by a wedge pin 38 driven through a transverse hole in the socket. An oil cup 39 is mounted upon the top of the trunnion pin. On the ends of the trunnion pin is pivotally mounted a swivel connection 40 which is journaled upon the jack shaft casing next to its supporting pedestal. An oil cup 41 is provided for lubricating the joint between the swivel connection and the jack shaft casing. This swivel arrangement of the ends of the radius rod permits one end of the rear axle to have both lateral and vertical movement with respect to the automobile frame.

The driving sprocket 42, which is secured upon the outer end of the jack shaft, is normally in alinement with the sprocket wheel 43, which is bolted to the brake drum 44 on the hub of the driving wheel. The driving chain 9, which is arranged on the sprocket wheels 42 and 43, is constantly changing in length, due to wear. The driving chain may be adjusted to take up its slack, and to maintain it in tension if desired, by adjusting the length of the radius rod 22 by means of the adjusting screw 28.

A brake spider 45 is journaled upon the axle between the radius rod swivel connection and the wheel hub, and within the brake drum. An oil cup 46 is mounted on the brake spider for lubricating the journal. This spider has two horizontal arms, which are radially and diametrically disposed with respect to the axis of the wheel. The extremity of the rear arm is fitted with an eccentric pin 47, upon the projecting ends of which are pivotally mounted slide blocks 48 which slidably engage between sets of parallel jaws 49 fixed to the inside of the brake band 50. The opposite arm of the brake spider terminates in a transverse sleeve or socket 51 parallel to the axle. This sleeve has passing through it a shaft 52, one end of which is within the brake drum and is provided with a cam 53 positioned between the parallel faces of the ends 54 of the brake band. A coil spring 55 is attached at its ends to the ends of the brake band and holds them in contact with the cam 53. The other end of the sleeve projects through a slot in the radius rod. Pivoted upon the projecting end of the sleeve 51 is a square block 56 which slides in the parallel sides or ways 57 of the slot in the radius rod. One end of the shaft 52 projects through the sleeve and an arm 58 is mounted thereon for rotating the same. This arm is connected by means of suitable mechanism with the hand or foot brake operating lever of the automobile. An oil cup 59 on the end of the shaft 52 provides a means for lubricating the sleeve and parts carried thereby.

The above described arrangement of driving wheel brake parts insures that the brake drum and brake spider shall be concentric with each other irrespective of the position of the axle with respect to the frame, and it also relieves the axle and springs of the braking torque, which is entirely carried by the radius rod. The eccentric pin 47 allows the brake band to be adjusted or centered in the brake drum in case of unequal wear of the braking surface or cam actuating means.

It is evident that the precise forms and arrangements of parts shown in the drawings are not essential to the practice of this invention, and the invention is not limited thereto.

What I claim as my invention is as follows:

1. In a vehicle, an axle, a frame, flexible supporting means on said axle for said frame, said means being movable with respect to said frame, a radius rod having one end pivotally secured to a swivel connection journaled on said axle and its other end rotatably secured to a swivel pin in longitudinal alinement with said radius rod, the extremity of said pin being pivotally mounted in a swivel connection journaled upon a part fixed to said frame.

2. In a vehicle, an axle, a frame supported on said axle by means of a spring, a radius rod having one end pivotally secured to a swivel connection journaled on said axle and its other end provided with a longitudinal bearing member, said bearing member being rotatably mounted on a swivel pin which is pivotally mounted in a swivel connection journaled upon a part fixed to said frame, and means for adjusting said journal bearing lengthwise of said radius rod.

3. In a vehicle, an axle and a frame supported thereon by means of springs, a radius rod pivotally connecting said axle and frame for relative sidewise movement, a brake drum mounted for rotation upon said axle, a brake spider journaled upon said axle and concentric with said drum, a friction member loosely connected to said brake spider and adapted for movement into frictional engagement with said drum, an abutment on said radius rod adjacent to said brake spider and means on said brake spider engaging said abutment.

4. In a vehicle, an axle and a frame supported thereon by means of springs, a radius rod pivotally connecting said axle and frame for relative sidewise movement, a brake drum mounted for rotation upon said axle, a brake spider journaled upon said axle and concentric with said drum, a friction member loosely connected to said brake spider and means for moving said member into frictional engagement with said drum, an abutment on said radius rod adjacent to said brake spider, a sliding block engaging said abutment, and means on said brake spider pivotally engaging said sliding block.

5. In a vehicle, an axle and a frame supported thereon by means of springs, a radius rod pivotally connecting said axle and frame for relative sidewise movement, a brake drum mounted for rotation upon said axle, a brake spider journaled upon said axle and concentric with said drum, a friction member loosely connected to said brake spider and means for moving said member into frictional engagement with said drum, an abutment on said radius rod adjacent to said brake spider, and a sliding block engaging said abutment, said friction member moving means and said sliding block being concentrically arranged and pivotally mounted on said brake spider.

6. In a vehicle, an axle and a frame supported thereon by means of springs, a radius rod pivotally connecting said axle and frame for relative sidewise movement and having one end mounted for rotation about said axle, a brake spider journaled upon said axle adjacent to said radius rod, an abutment on said radius rod adjacent to said brake spider, and means on said brake spider slidably engaging said abutment, whereby relative rotation about said axle of said brake spider and radius rod with respect to one another is prevented.

7. In a vehicle comprising a frame and a driving axle, springs for supporting said frame on said axle, a driving shaft mounted on said frame parallel to said axle, a radius rod having one end pivoted to a swivel journaled on said axle and the other end connected to a swivel journaled on said shaft, said connection comprising a swivel pin rotatably mounted in said radius rod in longitudinal alinement therewith and having trunnions at right angles thereto pivotally mounted in the swivel on said shaft, whereby the ends of said radius rod are rotatable with respect to each other and their respective pivotal axes are concentric with the axes of said axle and shaft, respectively.

Signed at Detroit, Michigan, this 19th day of May, 1913.

HERBERT W. ALDEN.

Witnesses:
 LESLIE WILLIAMS,
 EDWIN SWEITZER.